April 2, 1963 A. L. JACOBSON Re. 25,364

ROOF DECK

Original Filed Jan. 3, 1955

INVENTOR.
Arthur L. Jacobson
BY
Merriam, Smith & Marshall
Attorneys

United States Patent Office

Re. 25,364
Reissued Apr. 2, 1963

25,364
ROOF DECK

Arthur L. Jacobson, Seattle, Wash., assignor to Inland Steel Products Company, a corporation of Delaware Original No. 2,832,300, dated Apr. 29, 1958, Ser. No. 479,390, Jan. 3, 1955. Application for reissue Nov. 20, 1959, Ser. No. 854,526
4 Claims. (Cl. 189—34)

Matter enclosed in heavy brackets [ ] appears in the original patent but forms no part of this reissue specification; matter printed in italics indicates the additions made by reissue.

The present invention relates to light-weight structural roof decks constructed from sheet metal panels which are formed with beams and interfit in side-by-side relation.

One of the objects of the present invention is to provide such a roof deck which can carry normal roof loads on a long span and yet complete favorably, economically speaking, with ordinary combustible roof construction.

The invention further aims to provide such a roof deck which can be easily accoustically treated with removable tiles or panels without the use of clips or other apparatus to give a finished ceiling and at the same time provide space thereabove to conceal electrical conduit.

Other more particular objects and advantages will, together with these general objects, appear and be understood in the course of the following description and claims, the invention consisting in the novel construction and in the adaptation and combination of parts hereinafter described and claimed.

Figure 1:
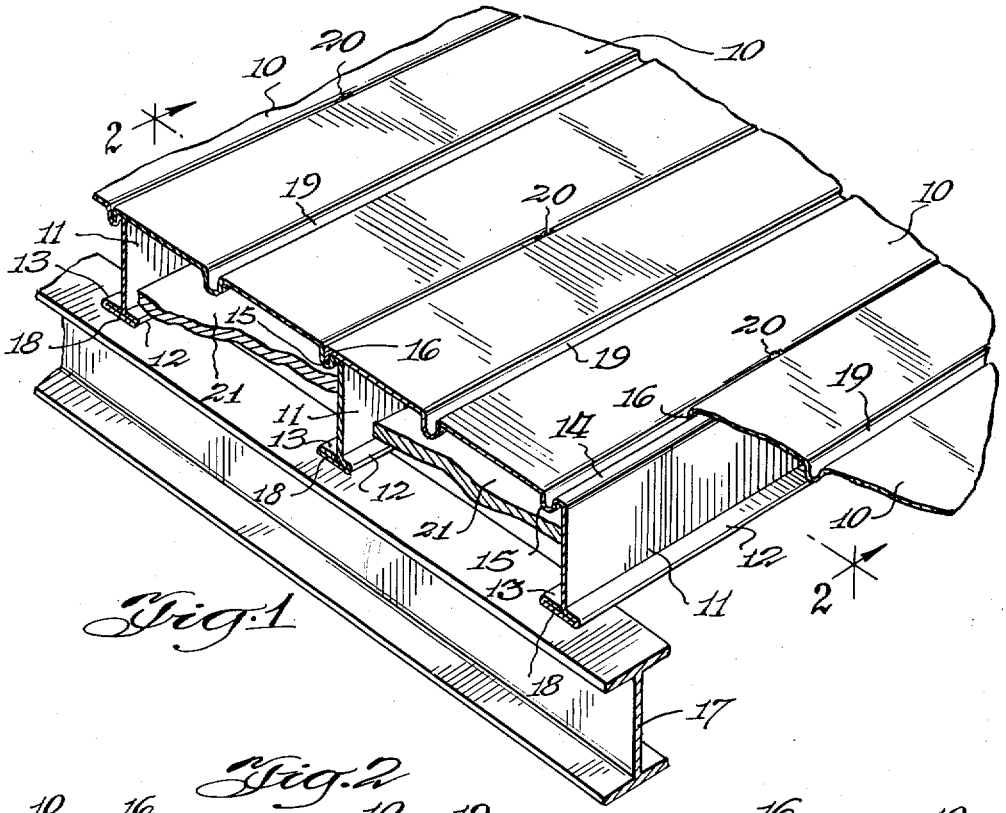
FIGURE 1 is a fragmentary perspective view of a portion of a roof deck constructed with my improved panels; [and]

Referring to the drawings it is seen that the roof deck is made up of a plurality of sheet metal panels each formed with a deck section 10 and a beam section of an inverted T configuration. The latter has an upstanding web 11 with oppositely extending two-ply flanges 12, 13 at its lower side. Flange 12 is formed by bending the panel sheet metal stock longitudinally at right angles to the web 11 to form an upper ply and then back upon itself on the underside of this upper ply to form a lower ply. From the latter the sheet is continued to the opposite side of the web from the flange 12 to form the lower ply of the flange 13 and is then bent back upon itself to terminate at the web and provide the upper ply of the flange 13. In this manner the flanges 12, 13 together present an uninterrupted lower face and have their upper faces coplanar.

Between the web 11 and the inner side edge of the deck section 10 the metal sheet is upwardly and downwardly ribbed to provide a horizontal shelf 14 continuing from the upper edge of the web and a groove 15 located between the shelf and the deck section 10. It will be noted that the shelf 14 is spaced below the upper face of the deck section 10 by the thickness of the panel sheet stock. The deck section is desirably longitudinally ribbed downwardly at 19 near its transverse center line for strengthening purposes and has its outer side edge bent downwardly for a distance somewhat less than the depth of the groove 15 to form a longitudinal tongue 16.

In assembling the roof deck the above-described panels are placed side-by-side on purlins 17 with the tongue 16 of each panel fitted into the groove 15 of the next and defining longitudinal seams. Since the width of the grooves exceeds the thickness of the tongues 16 the panels can be adjusted somewhat in the lateral direction. Each panel is then welded to the supporting purlins 17 by end welds 18. Next the tongues 16 are tack-welded as at 20 at spaced intervals along the longitudinal seams. As a result there is presented a continuous roof deck which is uninterrupted except by the ribs 19 and the longitudinal seams and therefore offers substantially a one hundred percent surface for the application of insulation and built-up roofing. Where more than one row of panels is required the rows are spaced apart somewhat and the resulting gap is covered by a cover plate which is tack-welded in position.

Figure 2:
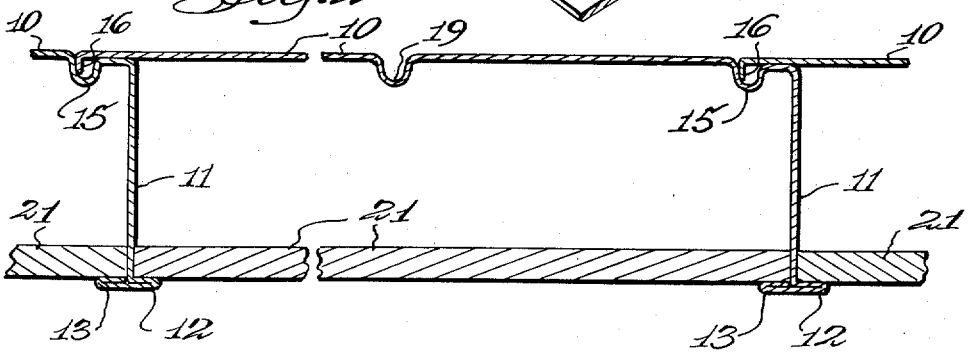
FIG. 2 is an enlarged fragmentary vertical sectional view taken along line 2—2 of FIG. 1 [.]; *and*
Figure 3:
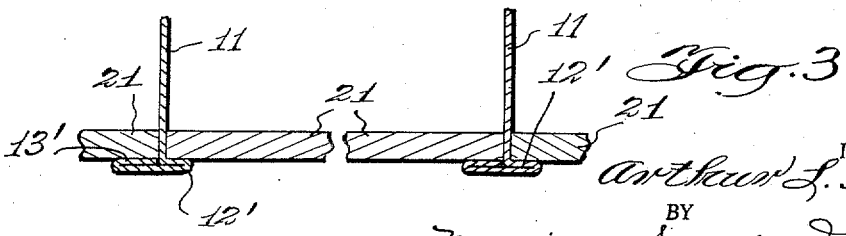
*FIG. 3 is an enlarged fragmentary view illustrating an alternative embodiment showing flanges of unequal length.*

As shown in FIG. 2, the flanges 12, 13 not only give adequate bearing area and contribute structural strength to the roof deck but also can give support for accoustical tiles 21 or other suitable removable ceiling panels. Such a tile 21 can be easily installed by first tilting it endwise and then raising the tilted tile between a set of the flanges 12, 13 sufficiently to clear the latter whereafter the tile can be lowered to rest on the flanges. If the web 11 of each panel is given a particularly shallow depth it may be necessary to make the flanges [12, 13] *12', 13'* of unequal width as *shown in FIG. 3* so that the tiles 21 can be installed as described above. In such a case, the appearance of the finished ceiling when viewed from below will be the same. It will be noted that sufficient space remains between the tiles and the deck sections 10 for the passage of electrical conduit.

The advantages of the invention, it is thought, will have been clearly understood from the foregoing detailed description of the illustrated preferred embodiments. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

I claim:

1. A sheet metal roof deck panel consisting of an elongated single sheet of metal formed into a deck section and a beam section with a narrow shelf therebetween, said deck section having along its inner side a downwardly directed rib merging with said shelf and having along its outer side a downturned locking tongue terminating as one side edge of said sheet, and said beam section depending from said shelf by a web perpendicular to the deck section proper and having at the lower side of said web a pair of oppositely directed coplanar two-ply flanges each having an elbow at its outer side connecting its upper and lower plies, the lower plies of said flanges resting against the lower faces of the upper plies and collectively presenting an uninterrupted lowermost face extending between said elbows in parallel relation to the roof deck proper while the upper plies of said flanges have their inner sides, one merging with said web and the other terminating as the other side edge of said sheet, said shelf being spaced below the upper face of said deck section by the thickness of said sheet and said rib having its groove deeper than the width of said tongue and wider than said sheet thickness, whereby, a plurality of said roof deck panels can be interfitted in side-by-side relation by the tongues and grooves thereof with the deck section of one resting on the shelf of the next, thereby forming a roof deck having regularly spaced depending beam sections with their two-ply flanges arranged in coplanar relation for removably supporting ceiling panels in a level manner between the webs of the beam sections and spaced below the deck sections, whereupon, said uninterrupted lowermost faces of the beam sections become the only surfaces of the roof deck exposed to view from below the ceiling.

*2. A sheet metal roof deck panel consisting of an elongated single sheet of metal formed into a deck section and a beam section with a narrow shelf therebetween, said deck section having along its inner side a downwardly directed grooved rib extending below said shelf merging therewith and having along its outer side a downturned locking tongue terminating as one side edge of said sheet, and said beam section depending from said shelf by a web perpendicular to the deck section proper and having at the lower side of said web a pair of oppositely directed coplanar two-ply flanges each having an elbow at its outer side connecting its upper and lower plies, the lower plies of said flanges resting against the lower faces of the upper plies and collectively presenting an uninterrupted lowermost face extending between said elbows in parallel relation to the roof deck proper while the inner side of one upper ply of said flanges merges with said web and the inner side of the other upper ply terminates as the other side edge of said sheet, said shelf being spaced below the upper face of said deck section by the thickness of said sheet and said rib having its groove deeper than the width of said tongue and wider than said sheet thickness, whereby, a plurality of said roof deck panels can be interfitted in side-by-side relation by the interaction of the respective tongues and grooves of adjacent panels with the deck section of one resting on the shelf of the next, thereby forming a flat, continuous roof deck having regularly spaced depending beam sections with their two-ply flanges arranged in coplanar relation for removably supporting ceiling panels in a level manner between the webs of the beam sections and spaced below the deck sections, whereupon, said uninterrupted lowermost faces of the beam sections become the only surfaces of the roof deck exposed to view from below the ceiling, the width of said webs being sufficient to provide a diagonal distance from the outer edge of one of said flanges to a corner formed by a cooperating web and deck section of not less than about the transverse distance between the opposite faces of the webs of adjacent beam sections.*

*3. A sheet metal roof deck panel consisting of an elongated single sheet of metal formed into a deck section and a beam section with a narrow shelf therebetween, said deck section having along its inner side a downwardly directed grooved rib extending below said shelf merging therewith and having along its outer side a downturned locking tongue terminating as one side edge of said sheet, and said beam section depending from said shelf by a web perpendicular to the deck section proper and having at the lower side of said web a pair of oppositely directed coplanar two-ply flanges each having an elbow at its outer side connecting its upper and lower plies, the lower plies of said flanges resting against the lower faces of the upper plies and collectively presenting an uninterrupted lowermost face extending between said elbows in parallel relation to the roof deck proper while the inner side of one upper ply of said flanges merges with said web and the inner side of the other upper ply terminates as the other side edge of said sheet, one of said flanges being shorter than the other, said shelf being spaced below the upper face of said deck section by the thickness of said sheet and said rib having its groove deeper than the width of said tongue and wider than said sheet thickness, whereby, a plurality of said roof deck panels can be interfitted in side-by-side relation by the interaction of the respective tongues and grooves of adjacent panels with the deck section of one resting on the shelf of the next, thereby forming a flat, continuous roof deck having regularly spaced depending beam sections with their two-ply flanges arranged in coplanar relation for removably supporting ceiling panels in a level manner between the webs of the beam sections and spaced below the deck sections, whereupon, said uninterrupted lowermost faces of the beam sections become the only surfaces of the roof deck exposed to view from below the ceiling, the width of said webs being sufficient to provide a diagonal distance from the outer edge of the shorter flange to a corner formed by a cooperating web and deck setion of not less than about the transverse distance between the opposite faces of the webs of adjacent beam sections.*

*4. A sheet metal roof deck panel consisting of an elongated single sheet of metal formed into a deck section and a beam section with a narrow shelf therebetween, said deck section having along its inner side a downwardly directed grooved rib extending below said shelf merging therewith and having along its outer side a downturned locking tongue terminating as one side edge of said sheet, and said beam section depending from said shelf by a web perpendicular to the deck section proper and having at the lower side of said web a pair of oppositely directed coplanar two-ply flanges each having an elbow at its outer side connecting its upper and lower plies, the lower plies of said flanges resting against the lower faces of the upper plies and collectively presenting an uninterrupted lowermost face extending between said elbows in parallel relation to the roof deck proper while the inner side of one upper ply of said flanges merges with said web and the inner side of the other upper ply terminates as the other side edge of said sheet, one of said flanges being shorter than the other with the shorter flange extending in the same direction as said roof section, said shelf being spaced below the upper face of said deck section by the thickness of said sheet and said rib having its groove deeper than the width of said tongue and wider than said sheet thickness, whereby, a plurality of said roof deck panels can be interfitted in side-by-side relation by the interaction of the respective tongues and grooves of adjacent panels with the deck section of one resting on the shelf of the next, thereby forming a flat, continuous roof deck having regularly spaced depending beam sections with their two-ply flanges arranged in coplanar relation for removably supporting ceiling panels in a level manner between the webs of the beam sections and spaced below the deck sections, whereupon, said uninterrupted lowermost faces of the beam sections become the only surfaces of the roof deck exposed to view from below the ceiling, the width of said webs being sufficient to provide a diagonal distance from the outer edge of the shorter flange to a corner formed by a cooperating web and deck section of not less than about the transverse distance between the opposite faces of the webs of adjacent beam sections.*

References Cited in the file of this patent or the original patent

UNITED STATES PATENTS

| | | |
|---|---|---|
| 1,900,711 | Howard | Mar. 7, 1933 |
| 1,913,342 | Schaffert | June 6, 1933 |
| 2,007,354 | Vass | July 9, 1935 |
| 2,028,272 | Burgess | Jan. 21, 1936 |
| 2,109,655 | Sylvan | Mar. 1, 1938 |
| 2,164,681 | Fould | July 4, 1939 |
| 2,242,558 | Venzie | May 20, 1941 |
| 2,449,292 | Gillett et al. | Sept. 14, 1948 |
| 2,773,718 | Bohlen | Dec. 11, 1956 |

FOREIGN PATENTS

| | | |
|---|---|---|
| 93,982 | Germany | of 1897 |
| 152,683 | Austria | of 1938 |
| 129,363 | Australia | Oct. 11, 1948 |

OTHER REFERENCES

Truscon Article, pages 8 and 9 of section 3d/6 of Sweet's 1945 file.

Fenestra Article, pages 8 and 9 of section 3c/3 of Sweet's Catalogue 1949 file.